United States Patent
Chang et al.

(10) Patent No.: US 8,333,893 B2
(45) Date of Patent: Dec. 18, 2012

(54) FILTRATION SEPARATION METHOD FOR WASTE RESIN CONTAINING HIGHLY RADIOACTIVE URANIUM POWDER AND DEVICE THEREOF

(75) Inventors: Kuo-Yuan Chang, Taoyuan County (TW); Ling-Huan Chiao, Taoyuan County (TW); Chin-Teng Hsu, Taoyuan County (TW); Chin-Chun Chu Ko, Taoyuan County (TW); Bing-Rong Wu, Taoyuan County (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 859 days.

(21) Appl. No.: 12/533,003

(22) Filed: Jul. 31, 2009

(65) Prior Publication Data
US 2011/0024364 A1    Feb. 3, 2011

(51) Int. Cl.
C02F 1/62 (2006.01)
C02F 1/36 (2006.01)
C02F 9/08 (2006.01)

(52) U.S. Cl. ............ 210/670; 210/202; 210/748.02; 210/203; 210/748.01; 210/745; 422/20; 422/159; 376/310; 376/313; 376/316; 588/20; 588/304; 588/310; 366/108

(58) Field of Classification Search ............ 210/748.02, 210/748.05, 745, 202, 670, 785, 791, 792, 210/257.2, 258, 269, 408, 409; 422/20, 159; 366/108; 588/20, 304, 310; 376/316, 313, 376/310
See application file for complete search history.

(56) References Cited

U.S. PATENT DOCUMENTS

| 4,116,838 | A * | 9/1978 | Lazzarotto | 210/209 |
| 7,128,840 | B2 * | 10/2006 | Wai et al. | 210/634 |
| 7,776,223 | B2 * | 8/2010 | Chang et al. | 210/747.4 |
| 2008/0053879 | A1 * | 3/2008 | Harris | 210/90 |

FOREIGN PATENT DOCUMENTS

JP         2001037844 A  *  2/2001

* cited by examiner

*Primary Examiner* — Joseph W. Drodge
*Assistant Examiner* — Cameron J Allen

(57) ABSTRACT

A filtration separation method for waste resin containing highly radioactive uranium powder and device thereof is mainly used for the waste resin after water treatment process in a nuclear facility. The uranium powder contained in the waste resin is highly radioactive. Thus, prior to the treatment of the waste resin, it is necessary to filter and separate the highly radioactive uranium powder to reduce the radioactivity. It is to put the uranium powder containing waste resin into an underwater holding tank and withdraw the waste resin by an underwater pump into a uranium powder filtration box. Then the uranium powder filtration box is lifted by a hoist to move to an underwater ultrasonic cleaner. High-pressure water flushing is applied and followed by underwater ultrasonic cleaning. Then the cleaning water (containing precipitated uranium powder) from the ultrasonic cleaner is drained to uranium powder collection device. If the radioactivity of the waste resin is still high, high-pressure cleaning by water nozzle flushing and ultrasonic cleaning are applied several times until the radioactivity of the waste resin is lowered to the treatment standard and converted to low-radioactivity waste for further treatment.

4 Claims, 4 Drawing Sheets

FILTRATION SEPARATION METHOD FOR WASTE RESIN CONTAINING HIGHLY RADIOACTIVE URANIUM POWDER AND DEVICE THEREOF

BACKGROUND OF THE INVENTION

1. Field of the Invention

The present invention is related to a filtration separation method for waste resin containing highly radioactive uranium powder and device thereof. Especially it refers to a method and device that is simple, easy operating and effectively improves the waste resin treatment after water treatment in a nuclear facility.

2. Description of the Prior Art

The waster resin used in water treatment in a nuclear facility is mostly stored in a water pond to block its high radioactivity. When a nuclear facility is retired, the water pond will be cleaned and the waste resin in the water pond will be removed. The highly radioactive uranium powder in the waste resin will be separated and stored to reduce the waste resin activity and also converted to low-radiation waste for further treatment.

There is a traditional method of filtration and separation for the highly radioactive uranium powder in the waste resin. But there is also not domestic experience in cleaning the water pond from a retired nuclear facility. Nevertheless, it is necessary to use foreign experience and consider the harm to human body by the possible accumulation of large amount of radiation dose.

A complete filtration and separation method for the highly radioactive uranium powder in waster resin is for an operator to remotely control the automatic separation device in water and operate the separation filtration device outside the radiation area. The device control and operation is very complicated and relies on underwater camera system to complete the filtration operation. The process is slow and lacks efficiency. Although the result is better and the process prevents operators from accumulating radiation dose in the radiation area, the device is expensive and lacks convenience in a practical application. Therefore, how to simplify the operation, improve efficiency and minimize the exposure of operators to excessive radiation dose by a simple, easy and affordable process is a very important subject.

In view of the drawbacks with the traditional filtration separation method and device for the highly radioactive uranium powder from the waste resin, the inventor has sought improvement and come up with the present invention.

SUMMARY OF THE INVENTION

The main objective for the present invention is to provide a filtration separation method for the highly radioactive uranium powder in waster resin to effectively simplify the process, improve efficiency and minimize the operator exposure to radiation within a controllable range.

Another objective for the present invention is to provide filtration separation device for the highly radioactive uranium powder in waster resin that has a very simple structure and does not need much investment to effectively reduce operation cost.

To achieve the above objectives and results, the technical approaches adopted are as follows:

A filtration separation method for the highly radioactive uranium powder in waster resin at least comprises: a step to collect high-activity waste resin by using a water-containing holding tank; a step to transfer waste resin to uranium powder filtration box by using an underwater pump to withdraw the waste resin from the holding tank to a uranium powder filtration tank; a step to move uranium powder filtration box into a underwater ultrasonic cleaner by using a hoist to drop the uranium powder filtration box into a underwater ultrasonic cleaner; a step to clean the uranium powder filtration box in a high pressure cleaner, which sticks its water nozzle into the uranium powder filtration box and moves around to clear out the waste resin inside and flush out the uranium powder with the high pressure water; a step to use ultrasonic to clean the uranium powder filtration box, which a ultrasonic cleaner is operated to force the uranium powder to diffuse out from the waste resin in the uranium powder filtration box; a step to withdraw the uranium powder from the underwater ultrasonic cleaner to the uranium powder collection device, which the drainage of the ultrasonic cleaner is started to drain the cleaning water (containing precipitated uranium powder) into a uranium powder collection device; a step to determine whether the cleaning water of the uranium powder filtration box is clean, which investigates the clarity of the cleaning water to determine if the radioactivity of the waste resin after cleaning is reduced to the treatment standard, and if not, it indicates excessive uranium powder still exists and the high-pressure cleaning step for uranium powder filtration box will repeat, and if yes, it indicates the residual uranium powder is reduced to a certain level and it is ready for the next step; a step to collect the waste resin by a waste resin collection tank, which uses a underwater pump to withdraw the waste resin after cleaning to the external waste resin collection tank for further treatment.

A filtration separation device for highly radioactive uranium powder in waste resin at least comprises: a holding tank containing water to temporarily hold the waste resin containing uranium powder; a uranium powder filtration box to filter the uranium powder in the waste resin; a underwater pump to withdraw the waste resin from the holding tank into the uranium powder filtration box; a high-pressure cleaner that is equipped with a water nozzle to stick into the uranium powder filtration box and clean the waste resin with high-pressure water; a underwater ultrasonic cleaner to generate ultrasonic wave to clean the waste resin and allow the uranium powder to pass through the uranium powder filtration box and precipitate outside.

To make further understanding of the above objectives, functions and features for the present invention, the following explanation is provided with figures.

DETAILED DESCRIPTION OF A PREFERRED EMBODIMENT

Figure 1:
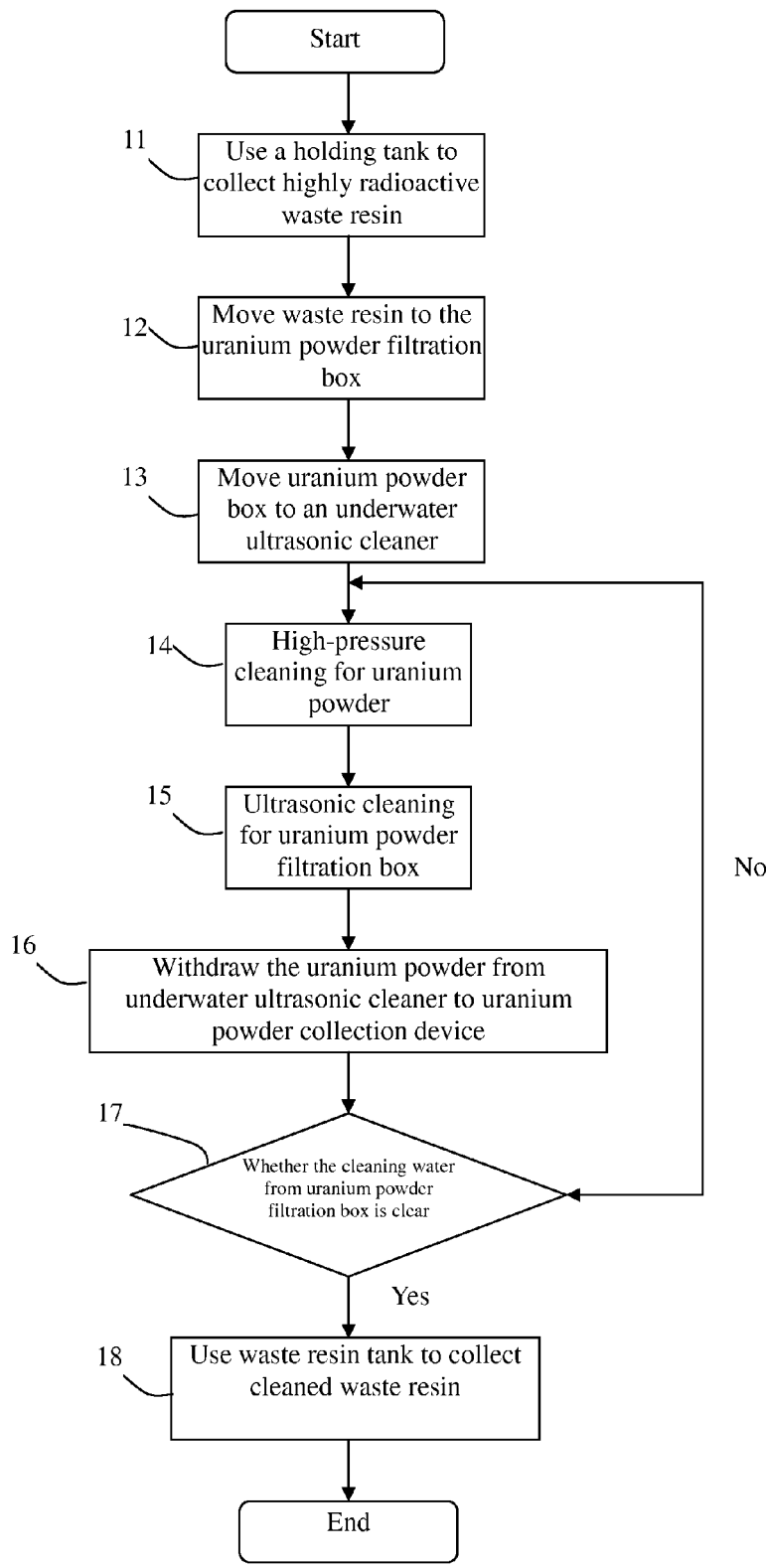
FIG. 1 is the process flow diagram for the present invention.
Figure 2:
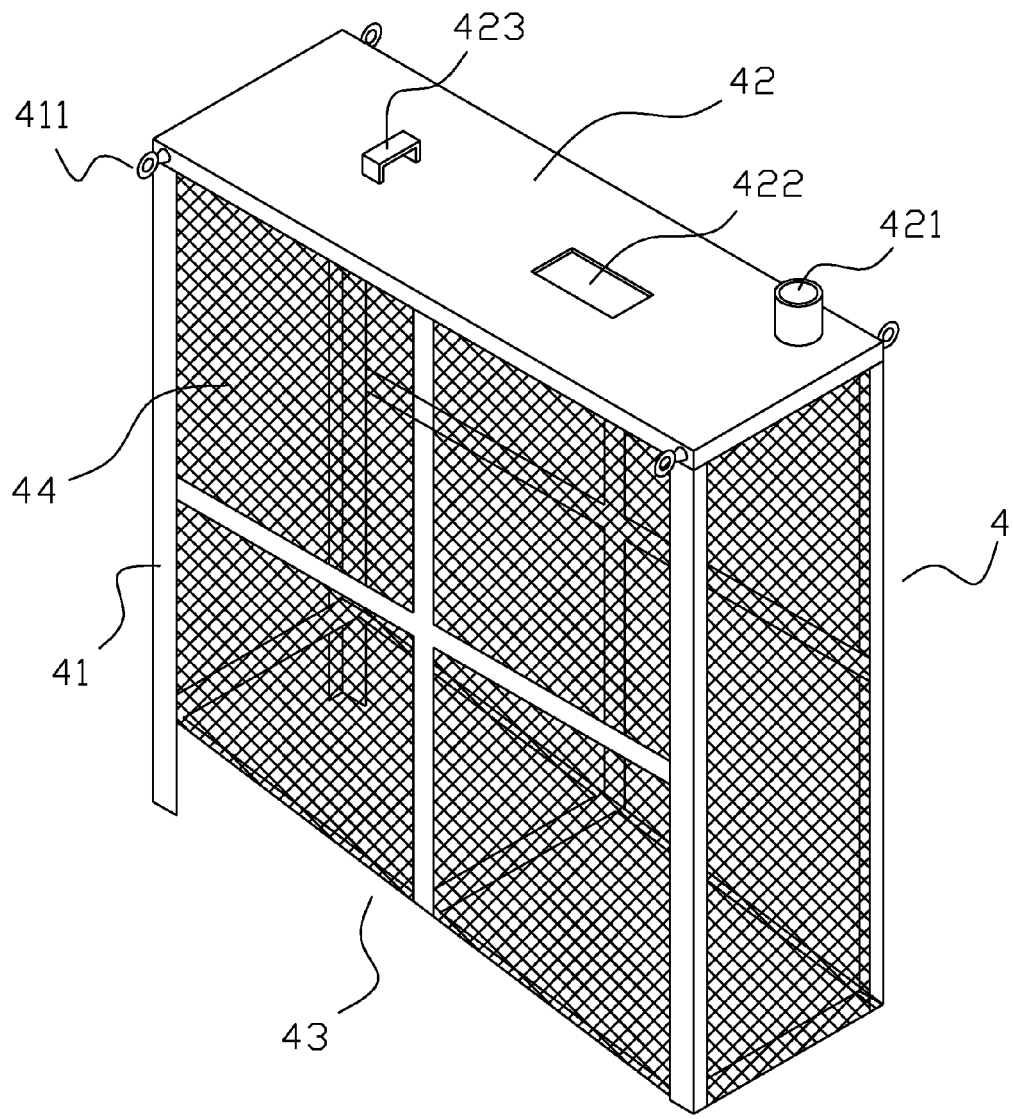
FIG. 2 is the three-dimensional structure for the uranium powder filtration box of the present invention.
Figure 3:
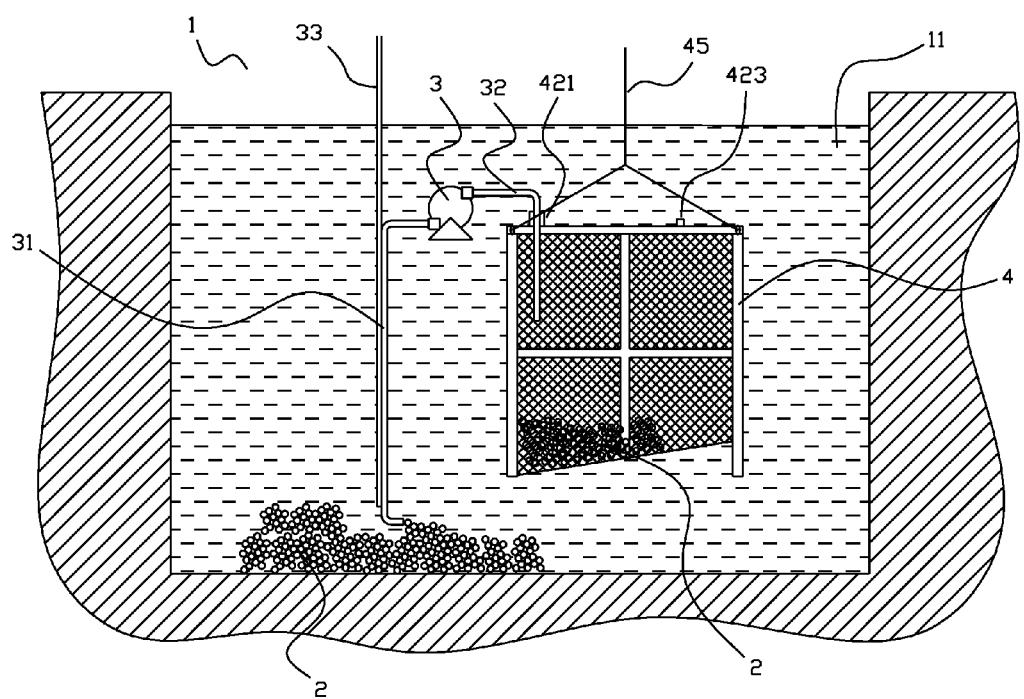
FIG. 3 is the illustration of the process that the present invention uses an underwater pump to withdraw the waste resin containing uranium powder into the uranium powder filtration box.
Figure 4:
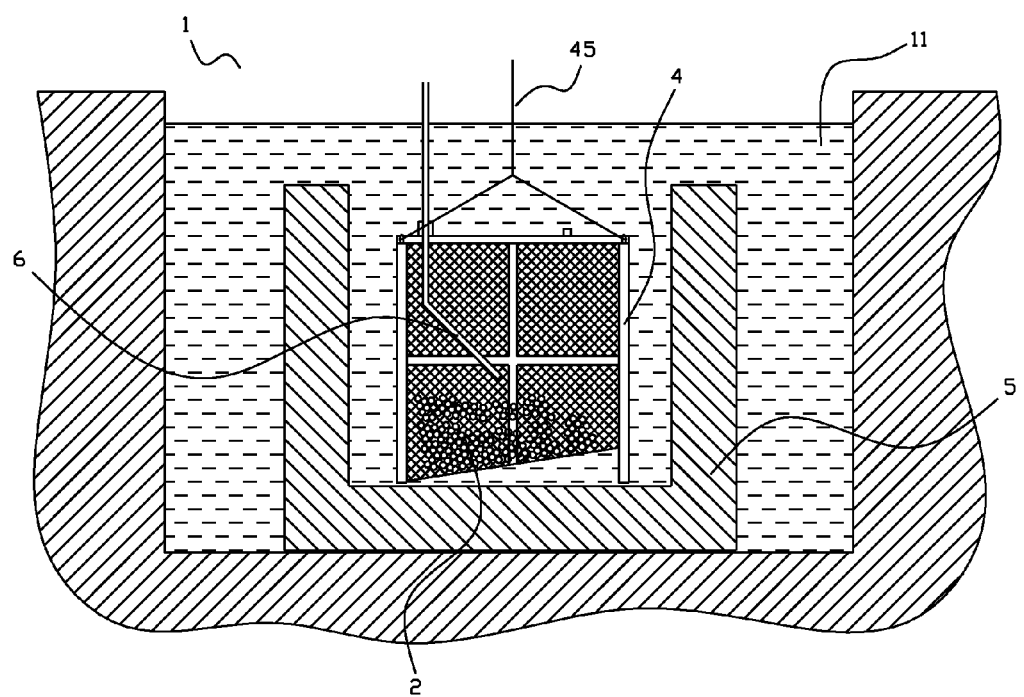
FIG. 4 is the illustration of the cleaning and filtration process for the uranium powder filtration box of the present invention.

FIG. 1 is the process flow diagram for the present invention. The figure shows that the main procedure for the present invention comprises: step 1 that uses a holding tank to collect high-activity waste resin, step 2 that transfers the waste resin to a uranium powder filtration box, step 3 that transfers the uranium powder filtration box to a underwater ultrasonic cleaner, step 4 that uses high pressure cleaning for cleaning the uranium powder filtration box, step 5 that uses ultrasonic to clean the uranium powder filtration box, step 6 that withdraws the uranium powder from the underwater ultrasonic cleaner to the uranium powder collection device, step 7 that determines whether the cleaning water from the uranium powder filtration box is clear, step 8 that uses a waste resin tank to collect the waste resin after cleaning. The figures from FIG. 2 to FIG. 4 explain the above steps. First, step 1 uses a hoist to drop the resin bottle into the water 11 containing holding tank 1 and pour the high-radioactivity waste resin 2 from the resin bottle into the holding tank 1, and then uses the same hoist to lift the resin bottle out of the water, and then uses high-pressure cleaner to stick a water nozzle into the resin bottle to purge out all the residual waste resin 2. Step 2 that transfers the waste resin to a uranium powder filtration box manually uses a hand-held long rod 33 by the pond to lead the inlet of an incoming pipe 31 of an underwater pump 3 while the outgoing pipe 32 of the underwater pump 3 sticks into the uranium powder filtration box 4. The uranium powder filtration box 4 is constructed by main supporting beams 41 in approximately rectangular shape and a slanting bottom 43. There is a top cover 42 on the top of the uranium powder filtration box 4. There are an easy grasping handle 423, a transparent view window 422 and a through-pipe opening 421 on the top cover 42. The pipe opening 421 allows the above-mentioned outgoing pipe 32 to pass through. On the main supporting beams 41 there are a plural number of rings 411 for the external cables 45 to pass through and lift the uranium powder filtration box 4. Around the main supporting beams 41, except for the top cover 42, there is a 200-mesh stainless steel net 44. Then, the operator starts the underwater pump 3 and hand-holds the long rod 33 to lead the movement of the inlet of the incoming pipe 31 of the underwater pump 3 inside the holding tank 1 and withdraw the high-radioactivity waste resin 2 (containing uranium powder) from the holding tank 1 into the uranium powder filtration box 4. Step 3 that transfers the uranium powder filtration box to an underwater ultrasonic cleaner uses a hoist to drop the uranium powder filtration box 4 into an underwater ultrasonic cleaner 5 which size is large enough to accommodate the entire uranium powder filtration box 4. Step 4 that uses high pressure cleaning for cleaning the uranium powder filtration uses a high-pressure cleaner and sticks a water nozzle 6 into the uranium powder filtration box 4 and moves it around to clear the waste resin 2 inside, and uses high-pressure water to flush the uranium powder (for about 20 minutes). Step 5 that uses ultrasonic to clean the uranium powder filtration box is to start the ultrasonic cleaner 5 after the previous step is completed and uses ultrasonic vibration to clean the uranium powder filtration box 4 (for about two hours), which allows the uranium powder in the waste resin 2 to leach out through the stainless steel net 44. Step 6 that withdraws the uranium powder from the underwater ultrasonic cleaner to the uranium powder collection device is to start drainage for the ultrasonic cleaner 5 and drain the cleaning water (containing precipitated uranium powder) from the ultrasonic cleaner 5 to uranium powder collection device. Step 7 that determines whether the cleaning water from the uranium powder filtration box is clear is to investigate through the view window 422 if the cleaning water in the uranium powder filtration box 4 is clear to assure the radioactivity for the waste resin 2 after cleaning is reduced to the treatment standard, and if not, it indicates excessive uranium powder still exists and the high-pressure cleaning step 4 for uranium powder filtration box and the subsequent steps will repeat, and if yes, it indicates the residual uranium powder is reduced to a certain level and it is ready for the next step.

Step 8 that uses a waste resin tank to collect the waste resin after cleaning is to manually hold the long rod 33 by the pond and use quick connector to connect the outgoing pipe 32 of the underwater pump 3 to the external waste resin lines, and the incoming pipe 31 sticks into the uranium powder filtration box 4, and the underwater pump 3 starts to withdraw the cleaned waste resin 2 to the waste resin storage tank for further treatment.

In summary of the above description, the filtration separation method for waste resin containing highly radioactive uranium powder and device thereof can simplify the process, reduce the radioactivity of the waste resin and improve the operation efficiency for collecting high-radioactivity uranium powder. It is substantially innovative and progressive invention. The above description is only for a preferred embodiment of the present invention. Those extensions, modification, alteration or equivalent replacement based on the technical approaches and scope of the present invention shall fall into the range of claims by the present invention.

What is claimed is:

1. A filtration separation method for highly radioactive uranium powder in waste resin at least comprises:
    step 1: collecting high-activity waste resin in a water-containing holding tank, in which the water-containing holding tank is used to hold high-radioactivity waste resin;
    step 2: transferring the waste resin to a uranium powder filtration box, with an underwater pump to withdraw the waste resin from the holding tank into a uranium powder filtration box;
    step 3: moving the uranium powder filtration box into an underwater ultrasonic cleaner with a hoist;
    step 4: cleaning the uranium powder filtration box with a high pressure cleaner, which sticks a water nozzle of the high-pressure cleaner into the uranium powder filtration box, the cleaner applying high-pressure water to flush the uranium powder;
    step 5: cleaning the uranium powder filtration box with an ultrasonic cleaner, which produce an ultrasonic vibration to clean the uranium powder filtration box to allow the leaching of the uranium powder contained in the waste resin out of the uranium powder filtration box;
    step 6: withdrawing the uranium powder in the underwater ultrasonic cleaner into an uranium powder collection device by starting the ultrasonic cleaner to drain the cleaning water (containing precipitated uranium powder) in the ultrasonic cleaner to an uranium collection device;
    step 7: checking the clarity of the cleaning water in the uranium powder filtration box to assure the radioactivity of the waste resin after cleaning is reduced to a safety level, and if not, it indicates excessive uranium powder still exists and the high-pressure cleaning step for uranium powder filtration box and the subsequent steps will repeat, and if yes, it indicates the residual uranium powder is reduced to a safety level and it is ready for the next step;
    step 8: collecting the cleaned waste resin to an external waste resin storage tank with an underwater pump for further treatment.

2. The method of claim 1, wherein step 4) has an operation time of 20 minutes.

3. The method of claim 1, wherein step 5) has an operation time of 2 hours.

4. The method of claim 1, wherein the high-activity resin is poured from a resin bottle into the holding tank, and the resin bottle is flushed with high-pressure water.

* * * * *